United States Patent
Bhushan et al.

(10) Patent No.: US 7,155,246 B2
(45) Date of Patent: Dec. 26, 2006

(54) TRANSMITTER DIRECTED CODE DIVISION MULTIPLE ACCESS SYSTEM USING MULTI-USERS DIVERSITY TO MAXIMIZE THROUGHPUT WHILE EQUITABLY PROVIDING ACCESS TO USERS

(75) Inventors: Naga Bhushan, San Diego, CA (US); Etienne Francois Chaponniere, San Diego, CA (US); Peter J. Black, San Diego, CA (US); David Ngar Ching Tse, Berkeley, CA (US)

(73) Assignee: Qualcomm, Incorporated, San Diego, CA (US)

( * ) Notice: Subject to any disclaimer, the term of this patent is extended or adjusted under 35 U.S.C. 154(b) by 693 days.

(21) Appl. No.: 10/356,116

(22) Filed: Jan. 31, 2003

(65) Prior Publication Data

US 2003/0232625 A1 Dec. 18, 2003

Related U.S. Application Data

(63) Continuation-in-part of application No. 10/067,609, filed on Feb. 4, 2002, which is a continuation of application No. 09/345,700, filed on Jun. 30, 1999, now Pat. No. 6,449,490.

(51) Int. Cl.
*H04B 7/00* (2006.01)
*H04Q 7/20* (2006.01)

(52) U.S. Cl. ............. 455/509; 455/450; 455/452.2

(58) Field of Classification Search .......... 455/425, 455/450, 451, 452.1, 452.2, 453, 456.6, 509, 455/522; 370/264, 280, 281, 294, 295, 320, 370/335, 342

See application file for complete search history.

(56) References Cited

U.S. PATENT DOCUMENTS 3,351,859 A 11/1967 Groth, Jr. et al.

(Continued)

FOREIGN PATENT DOCUMENTS

WO 9912304 3/1999

(Continued)

OTHER PUBLICATIONS

Carlos H. Rentel et al., "Comparative Forward Link Traffic Channel Performance Evaluation of HDR and 1 EXTREME Systems," IEEE, vol. 1, U.S.A., May 6, 2002, pp. 160-164.

(Continued)

*Primary Examiner*—Quochien B. Vuong
*Assistant Examiner*—Dominic E. Rego
(74) *Attorney, Agent, or Firm*—Philip Wadsworth; Sandra L. Godsey; S. Hossain Beladi (57) ABSTRACT

A transmitter directed, distributed receiver using multi-user diversity provided by the distribution of the receiver. Advantage is taken of the uncorrelated variations over time in the condition of communication links between a common transmitter and several users. The greater the variation in the quality of a particular link over time, the greater the increase in total system throughput provided. An scheduler metric (or scheduler metric) represents the instantaneous quality of the communication link between each user and the transmitter with respect to the average quality of the link. Alternatively, the scheduler metric represents the instantaneous channel condition with respect to the average data throughput over that channel. The common transmitting station uses the scheduler metric to directly compare the desirability of granting each channel access with the desirability of granting each other channel access. The users with links that have the greatest scheduler metric are provided access to the channels.

26 Claims, 5 Drawing Sheets

U.S. PATENT DOCUMENTS

| | | |
|---|---|---|
| 4,112,257 A | 9/1978 | Frost |
| 4,222,115 A | 9/1980 | Cooper et al. |
| 4,291,410 A | 9/1981 | Caples et al. |
| 4,630,283 A | 12/1986 | Schiff |
| 4,669,091 A | 5/1987 | Nossen |
| 4,672,658 A | 6/1987 | Kavehrad et al. |
| 4,694,467 A | 9/1987 | Mui |
| 4,710,944 A | 12/1987 | Nossen |
| 4,736,460 A | 4/1988 | Rilling |
| 4,752,969 A | 6/1988 | Rilling |
| 4,765,753 A | 8/1988 | Schmidt |
| 4,797,950 A | 1/1989 | Rilling |
| 5,226,045 A | 7/1993 | Chuang |
| 6,081,536 A * | 6/2000 | Gorsuch et al. ............ 370/468 |
| 6,400,699 B1 | 6/2002 | Airy et al. |
| 2001/0046879 A1 * | 11/2001 | Schramm et al. ............ 455/525 |
| 2002/0068540 A1 * | 6/2002 | Skarman et al. ......... 455/232.1 |
| 2002/0141362 A1 | 10/2002 | Hsu et al. |
| 2002/0176380 A1 | 11/2002 | Holtzman et al. |
| 2003/0033522 A1 * | 2/2003 | Bilgic et al. ................. 713/168 |

FOREIGN PATENT DOCUMENTS

WO  02/093819  11/2002

OTHER PUBLICATIONS

Amitava Ghosh et al., "Performance of Coded Higher order Modulation and Hybrid ARQ for Next Generation Cellular CDMA Systems," IEEE Vehicular Technology Conference, vol. 2, New York, Sep. 24, 2000, pp. 500-505.

* cited by examiner

TRANSMITTER DIRECTED CODE DIVISION MULTIPLE ACCESS SYSTEM USING MULTI-USERS DIVERSITY TO MAXIMIZE THROUGHPUT WHILE EQUITABLY PROVIDING ACCESS TO USERS

RELATED APPLICATIONS

The present application is a continuation-in-part of U.S. patent application Ser. No. 10/067,609, filed Feb. 4, 2002, which is a continuation of U.S. patent application Ser. No. 09/345,700, filed Jun. 30, 1999, now U.S. Pat. No. 6,449,490, issued on Sep. 10, 2002, and all assigned to the assignee of the present application.

BACKGROUND OF THE INVENTION

1. Field of the Invention

The present invention relates to communication systems. More particularly, the present invention relates to a method and apparatus for selecting one or more users from among several users for access to communication services in a code division multiple access system.

2. Description of the Related Art

Communication access in system may be provided to one user at a time. Therefore, when a first user is granted access to the system, other user must wait until the first user has released the system; then access is granted to a new user. A scheduler may select the new user among the users waiting for access to the system. Each user may send a request for access to the scheduler. The scheduler then selects the new user from among the users that have made a request for access.

In a code division multiple access system (CDMA), access may be granted to several users at the same time over the same channel frequency. Access may be granted to the users based upon several criteria. The first criteria may relate to the type of services that each user has subscribed with the communication system. Access is provided to each user based on the priority of the subscribed services. For example, a user may request constant bit rate (CBR) service, variable bit rate (VBR) service, or available bit rate (ABR) service. Users with CBR service are guaranteed to receive communication services at the subscribed data rate (i.e., bit rate). In contrast, for users with VBR services, the users are provided communication services at the rate necessary to transmit the information. In such cases, the user's fees are typically calculated based upon the rates that were requested and granted to the user. If the user pays for ABR service, then the user is granted access at a data rate that is available at the time of access. In an order of priority, if there is sufficient capacity in the system to also provide access to an ABR user, then the ABR user is granted access at an available data rate. In one aspect, the capacity of the system is typically dependent upon whether the amplifier in the transmitter is capable of transmitting the ABR user's information with sufficient power without overdriving the amplifier in light of the amount of power required by each of the CBR and VBR users' power requirements. The available data rate at which the access is granted depends upon the amount of power that is available for transmitting the ABR user's data. An example of an ABR user is in case of an Internet Service Provider (ISP). Since customers of an ISP are able to tolerate delays and lower data rates, an ISP may typically select the less expensive ABR service. Moreover, there are frequently situations in which there is insufficient power to transmit data for all of the ABR users that are requesting ABR service at any particular point in time. Therefore, the transmitting station may determine to which ABR users service is to be provided in an order of priority.

Several techniques are known for determining how to select a user for access to a communication system in a shared access communication system in which access is granted to only one user at a time or to a few users that are less than all of the users requesting service. Access to a system may be provided to a user by one or more channels (i.e. air interface links between a common transmitting station and the user). Accordingly, each user may be associated with at least one channel. In a CDMA system, each channel is associated with a unique CDMA code. Typically, the condition (i.e. quality) of the channel directed to each user is changing over time. Furthermore, the condition of the channels varies from user to user. Access may be granted to the user that can use the system most efficiently. Such a user is associated with the best channel condition that is able to receive data at the highest rate. As such, the throughput of the communication system is maximized. The throughput of the system may be measured in terms of the amount of data communicated by the system over a period of time. Access may also be granted such that each user is provided with essentially equal access to the system over a period of time. Equal access may refer to either the fact that each user may receive an equal amount of time to communicate over the system, or that each user may transmit/receive an equal amount of data over a period of time.

The scheme in which the most efficient system user gets access and the scheme in which equal access is provided to each user are deficient. The scheme that focuses on maximizing throughput may lead to a situation in which some users receive minimal opportunity to access the system. The scheme in which each user is given equal access is also unacceptable due to the resulting inequitable distribution of access for different types of services. Moreover, in schemes in which each user is granted equal access regardless of the ability of that user to efficiently use the system, the throughput of the system suffers.

Accordingly, there is a need for a method and apparatus for determining to which user to grant access in a shared access communication system, such that the throughput of the system is maximized while ensuring that each user is granted equitable access to the communication system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENT(S)

Various aspects of the invention include a transmitter directed, multiple receivers (users) communication system that employs multi-users diversity to maximize system throughput while maintaining fairness among users. The transmitter sends data to multiple receivers (users) using one or more channels. A channel may represent a communication medium used by the transmitter, and may be shared by one or more receivers (users). The channel allows the transmitter to send data to any of the users sharing that channel. A communication link or an air-interface link may exist between each user and the common transmitting source. A channel may be used to support multiple communication links associated with the users sharing the channel. As such, a channel may be a collection of communication links, connecting the transmitter to each user sharing the channel.

Due to transmit power limitations or other restrictions, the transmitter may not be able to send data to all the users on a shared channel, at all times. The transmitter uses a scheduling algorithm to determine the subset of users who are served by a channel at any given time. In some cases, the scheduling algorithm may choose to serve at most one user on a channel, at any given time. The scheduler provides multi-user diversity by exploiting the fact that at least some of the receivers (users) are uniquely located with respect to other receivers. Due to the differing propagation paths and scattering, the variations in the link conditions seen by different receivers (users) would be uncorrelated. Therefore, at any particular time, the link to some receivers (users) has a better instantaneous quality relative to the average quality of that link measured over a period of time.

Various aspects of the invention achieve two essentially competing goals in a system in which access is provided to less than all of the users at any one time. The first of these two goals is to equitably provide access to the users of the communication system over one or more channels shared by multiple users (receivers). The second of these two goals is to maximize the total amount of data communicated to all the users of the communication system over a period of time (i.e., system throughput). Each of the various aspects of the invention balances the two competing goals by taking advantage of the uncorrelated variations in the link condition over time. In the case of two users competing for access to the system on a shared channel, the times at which the link conditions for the first user (i.e., quality of the first link) are relatively high are essentially arbitrary with respect to the times at which the link conditions for the second user (i.e., quality of the second link) are relatively high. In various embodiments of the invention, this fact is exploited by transmitting to the user that has the highest instantaneous link quality relative to the average quality of that link. That is, by transmitting over the channel to the user with the greatest ratio of current link conditions to average link conditions, each link serviced by the shared channel would be used when it is at its best. Thereby, the overall throughput of the system would be increased.

A determination is made for selecting the user (link) for granting access over a channel. The common transmitting station transmits information to the users in time slots. A time slot is a period of time having a predetermined duration. The common transmitting station may transmit to a limited number of users over the same time slot. In a simple case, a common transmitter may transmit on only one channel at a time. Accordingly, for each time slot, the common transmitting station may select one user (i.e., one link). The instantaneous condition of the link between a user and the common transmitting station is monitored by the user. An instantaneous link quality indicator is communicated by the user to the common transmitting station for each time slot; The instantaneous link quality indicator is a value representative of the condition of the user's link during one or more time slots. The common transmitting station filters the instantaneous link quality indicators associated with each user to generate a filtered output value for each link at each time slot. In accordance with one or more aspects of the invention, the filter function may be defined such that a filter output value associated with each user (link) and each transmission time slot represents the average throughput (i.e., average amount of data transmitted to that user over a period of time). Alternatively, the filter function may be defined such that the filter output value represents an average of the quality of the link between the common transmitting station and the user.

In accordance with one or more aspects of the invention, for each user (link), the value of the instantaneous link condition indicator is compared to (e.g., divided by) the filter output value for that channel to generate a "scheduler metric" for that channel. The scheduler metric is a measure of the desirability for granting the user an access relative to the desirability of granting an access for other users. The common transmitting station uses the scheduler metric to directly compare the desirability of granting access to the channel to any one user with the desirability of granting access to each other user. The user that has the greatest scheduler metric is provided access to the channel, in accordance with one or more aspects of the invention.

In accordance with one or more aspects of the invention, the filter output value is generated using a low-pass filter function to define a window in time over which the filter output value may be generated. A time constant of the filter reflects a "fairness time-scale" (i.e., the duration of the window in time). The fairness time-scale represents the duration of time over which it is desirable to have equitable access provided to each user. It should be understood that the fairness time-scale is dependent upon factors that include the type of data that is being transmitted to the users. One example may include the transmission of Internet data to users attempting to gain access to the Internet. If each user receives an equitable amount of access to the system within one second, each user is likely to consider the access granting scheme to be fair, even if one user gets greater access at the beginning portion of the second. Accordingly, one second would be an appropriate fairness time-scale. In contrast, if the fairness time-scale were only one millisecond, then allowing one user access to the system for the first 100 milliseconds of the second would not be considered to be fair.

In accordance with one or more aspects of the invention, the filter output value is updated only when the user (link) associated with that filter has been provided access. In accordance with one or more aspects of the invention, the filter output value is updated based on the rate at which that user received data. In this way, the filter output value reflects the average throughput to each user (link). This results in a built-in feedback mechanism that works to bias the selection of which user is to gain access. As such, in accordance with one or more aspects of the invention, when a user has been granted access, that user may be automatically penalized when competing for access in near future.

Alternatively, in the case in which the filter output value represents the average link quality seen by a user, a bias is created by artificially increasing the scheduler metric to compensate for the increase in the throughput to that user with respect to the users that did not received access during that period. The amount of this compensation may be fixed or may be proportional to the amount of data that was received during the last access. This allows the control of the average throughput to users to be weighted to favor those users that have received less data.

Figure 1:
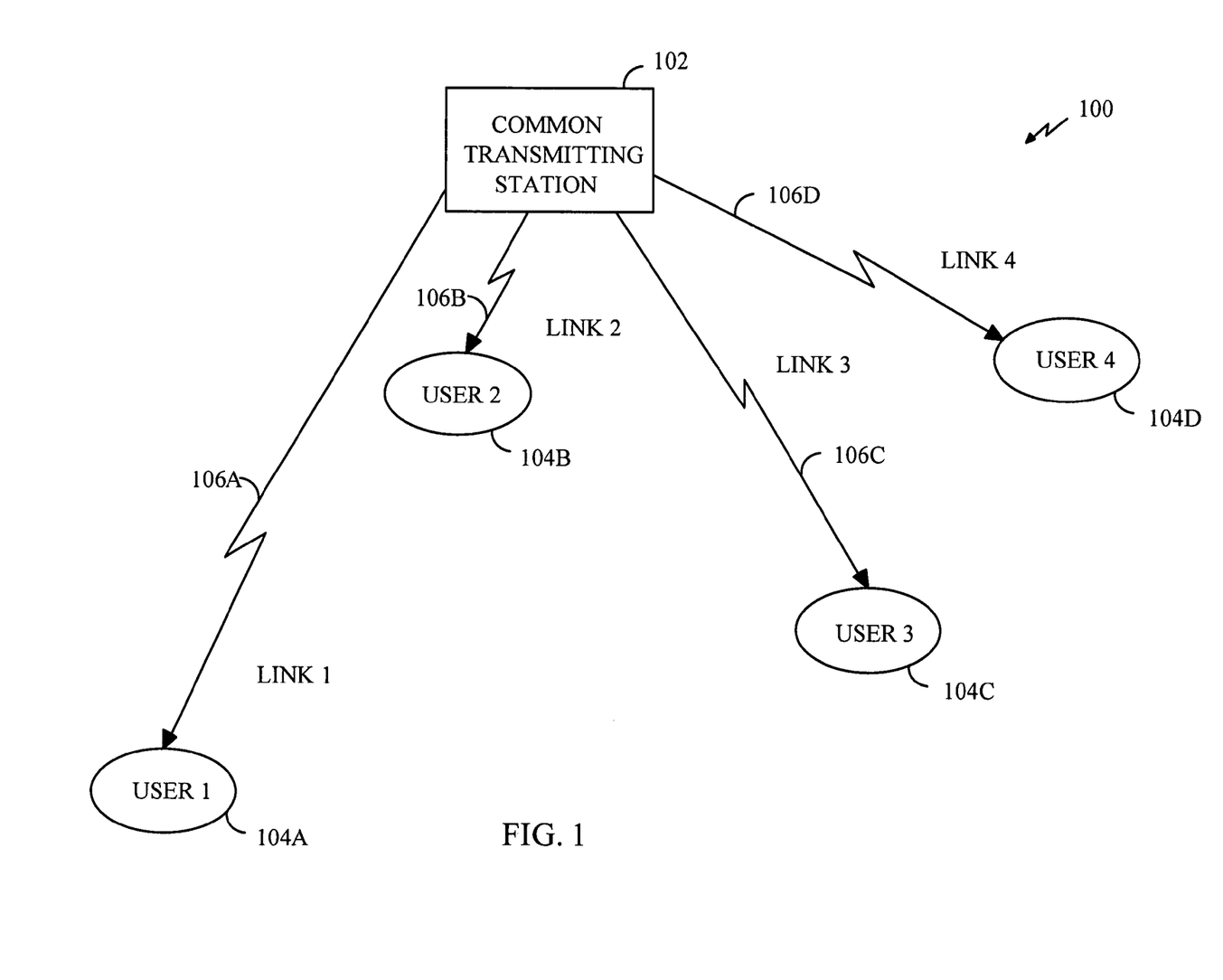
FIG. 1 is a simplified block diagram of a communication system capable of operating in accordance with various aspects of the invention.

FIG. 1 is a simplified block diagram of a communication system 100 in accordance with one or more aspects of the invention. The system 100 includes a common transmitting station 102 and a plurality of users 104. In FIG. 1, four such users 104 are shown. However, it will be understood by those skilled in the art that any number of users 104 may be included in the system 100. Furthermore, in cases in which one or more of the users 104 are mobile, the number of users 104 in the system may vary, over time. Each user 104 can be considered as a receiving element of a distributed receiver that includes all, or some, of the users 104. However, the users 104 of the presently disclosed method and apparatus need not combine, or provide to a common end user, the data that is received by each user 104. Accordingly, the users 104 may also be considered to be completely independent.

Each user 104 is capable of communicating with the common transmitting station 102 over a shared channel 106. The channel 106 provides a number of communication links to the users. For example, as shown in FIG. 1, a first user 104A receives transmissions from the common transmitting station 102 over the channel through link 106A. However, it should be noted that each user 104 may receive communications from the common transmitting station 102 over more than one channel. Moreover, each user 104 may have more than one communication links with the common transmitting station. Each of the communication links with a user may be over one channel or multiple channels. Such additional channels may be created using different frequencies, antennas, etc. In addition, such additional channels may exist due to multiple propagation paths between the common transmitting station 102 and the user 104. However, in one embodiment, multiple propagation paths for the same signal are combined and treated as a single link of the same channel.

In accordance with various aspects of the invention, the common transmitting station 102 transmits signals to users over different time slots. Each time slot preferably has a predefined and equal duration. However, the duration of such time slots may vary to accommodate varying data rates or for other reasons. The common transmitting station 102 preferably only transmits to one user 104 during each time slot. In another embodiment, the common transmitting station 102 transmits signals to more than one, but less than all, of the users 104 in each time slot. In either case, for each time slot, the common transmitting station 102 may need to determine to which user or users 104 signals are to be transmitted.

Various aspects of the invention provide for determining to which user or users 104 the common transmitting station 102 may transmit in a way that maximizes the amount of data to be transmitted to all users 104, while ensuring that each user 104 receives an equitable amount of data with respect to each other user 104 over a predetermined "fairness time-scale". An "equitable amount of data" means that essentially equal receive-capability ratios. The receive-capability ratio is equal to the amount of data transmitted over a channel relative to the data rate that the channel can support. However, various aspects may be adjusted to favor greater data throughput at the expense of providing more access to users using channels that can support higher data rates over the fairness time-scale.

In accordance with various aspects of the invention, each user 104 preferably monitors the condition of the link from the common transmitting station 102 and transmits an instantaneous link quality indicator to the common transmitting station 102. Each instantaneous link quality indicator is a value representative of the link condition experienced by one user during one or more time slots. In accordance with various aspects of the invention, the instantaneous link quality indicators are values representing a desired rate at which data is to be transmitted to the user 104 by the common transmitting station 102. In one such embodiment, the instantaneous channel condition indicators are data rate request (DRC) messages. Such DRCs typically indicate the maximum data rate at which data can be transmitted (through the communication link associated with the user) over the shared channel 106, with a predetermined bit error rate (BER).

The maximum data rate for a particular link 106 is indicative of the carrier-to-interference ratio (C/I) for the link 106. Alternatively, each user 104 monitors and communicates the C/I directly. In accordance with various aspects of the invention, the user 104 communicates instantaneous link condition indicators that provide the common transmitting station 102 with an indication of the condition (i.e., quality) of the link without direct reference to either C/I or data rates. For example, the user 104 may provide the common transmitting station 102 with an indication of the amount of interference received by the user 104 and the amount of loss in the link 106A between common transmitting station and the user 104.

It should be clear to those skilled in the art that there are several parameters, characteristic values, etc., that can be communicated by the user 104 to the common transmitting station 102 in order to characterize the link conditions seen by the user (i.e., the link quality). Various particular parameter or characteristic may be transmitted. In accordance with various aspects of the invention, the link condition indicator is directly proportional to the data rate at which the common transmitting station 102 may transmit data to the user 104 if that user is granted access to the channel 106 in a time slot. Such a time slot may be the next time slot.

Figure 2A:
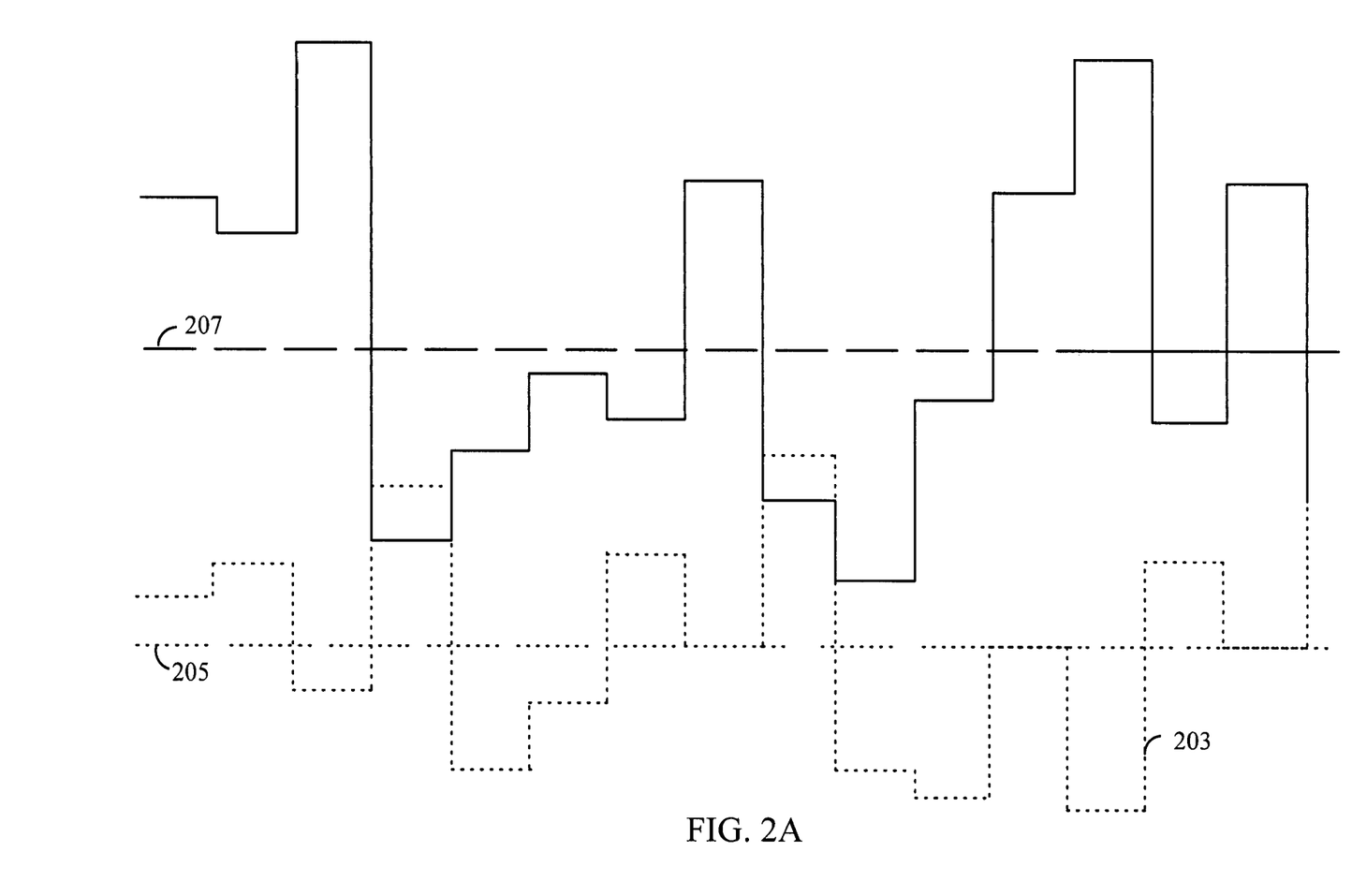
FIG. 2A is a graphical representation of the channel condition seen by a first user and a second user over time.

FIG. 2A is a graphical representation of the link condition of a first link, for example link 106A, represented by a line 203 and a second link, example link 106B, represented by a dotted line 201 over time. From FIG. 2, it can be seen that the quality for both links vary significantly over time. Furthermore, at nearly every point in time, the link 106B has superior conditions as compared to the link 106A. This can be understood by referring to FIG. 1 which shows that user 104A, which receives signals from the transmitter through the link 106A, is farther from the common transmitting station 102 than the user 104B, which receives communicates with the transmitter through the link 106B. The greater distance between the common transmitting station 102 and the user 104A results in greater attenuation of the signal being received by the first user 104A. This results in an average quality for the first link 106A (represented by a line 205) that is poorer then the average quality (represented by a dotted line 207) of the second link 106B.

It can be seen from FIG. 2A that the variations in the quality of the two links 106A and 106B are uncorrelated. Therefore, the times at which the quality of the first link is relatively high are essentially arbitrary with respect to the times at which the quality for the second link is relatively high. Various aspects of the invention allows exploitation of this fact by attempting to transmit to a user 104 associated with a link that has a relatively high instantaneous link quality relative to the average link conditions. That is, by transmitting over the channel to the user whose link has the greatest ratio of current link condition to average link condition, each link of the channel may be used when it is at its best. If each link is only used when it is at its best, the overall throughput of the system may be increased. Therefore, in accordance with various aspects of the invention, the user to which data is to be transmitted in any one time slot is selected as a function of the instantaneous link quality relative to the average link condition. However, in the an embodiment in accordance with various aspects of the invention, selection of the link over which data is to be transmitted in each slot is based on a function of the instantaneous link quality relative to the average data throughput of a channel.

It will be understood by those skilled in the art that granting access of the channel 106 to a user associated with a link having the highest quality relative to the average link conditions would greatly increase the data throughput for the channel that has links with greater time-variations in link quality. However, when contrasted with the throughput provided by an access scheme that granted equal access time to each user, such a scheme would not increase the data throughput for channels whose links have relatively low time-variations in quality.

Figure 2B:
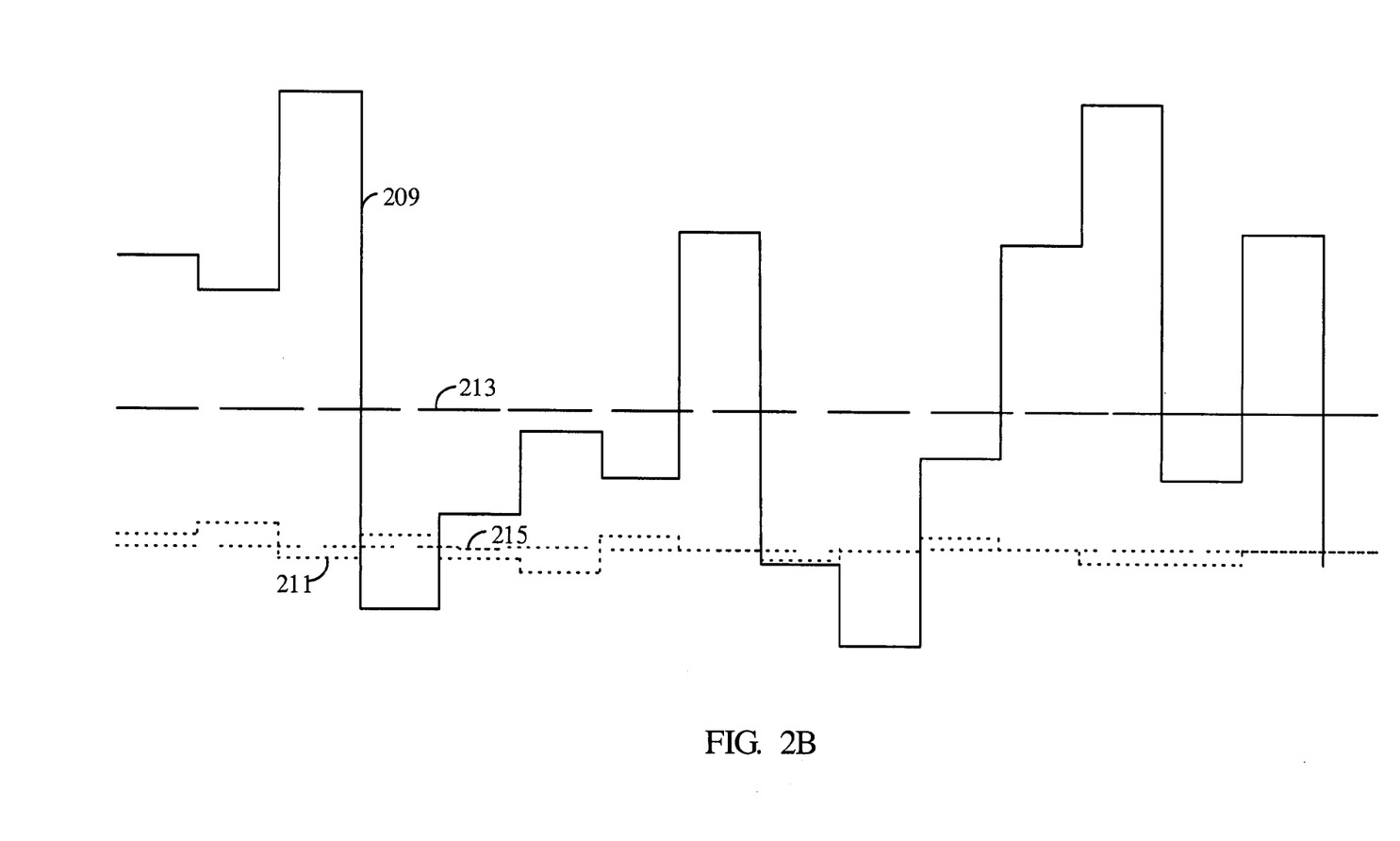
FIG. 2B is a graphical representation of the channel condition seen by a first user and a second user over time.

This can be understood by analyzing the case in which a first user 104A is associated with a link 106A that has relatively great variations in the link quality, while a second user 104B is associated with a link 106B that has relatively small variations in quality. FIG. 2B is a graphical representation of the quality of such a first link 106A and second link 106B. A line 209 represents the quality of the first link 106A and a dotted line 211 represents the quality of the second link 106B. A line 213 represents the average quality of the first link 106A and a dotted line 215 represents the average quality of the second link 106B.

Assuming that over the selected fairness time-scale, the quality of the first link 106A is greater than average for half the time and less than the average for half the time, the same amount of access time will be granted to both the first and second users 104A and 104B. However, the first user 104A may have, greater throughput than it would have had if equal access time were granted to each user arbitrarily (e.g., in round robin fashion). The second user 104B would have nearly the same data throughput, since the variations in the quality of the first link 106A would dominate the selection process at the common transmitting station 102. That is, during the times when the first link 106A has a relatively high quality, the second link 106B has an average quality. Accordingly, the first user is selected. During those times when the first link 106A has a relatively low quality, the second link 106B may have an average quality, and so the second user is selected.

In order to compensate for this characteristic, various aspects of the invention provide links through which data are to be transmitted in a way that allows some of the increase in throughput to be distributed to users 104 associated with links that have relatively small variations in link condition.

Figure 3:
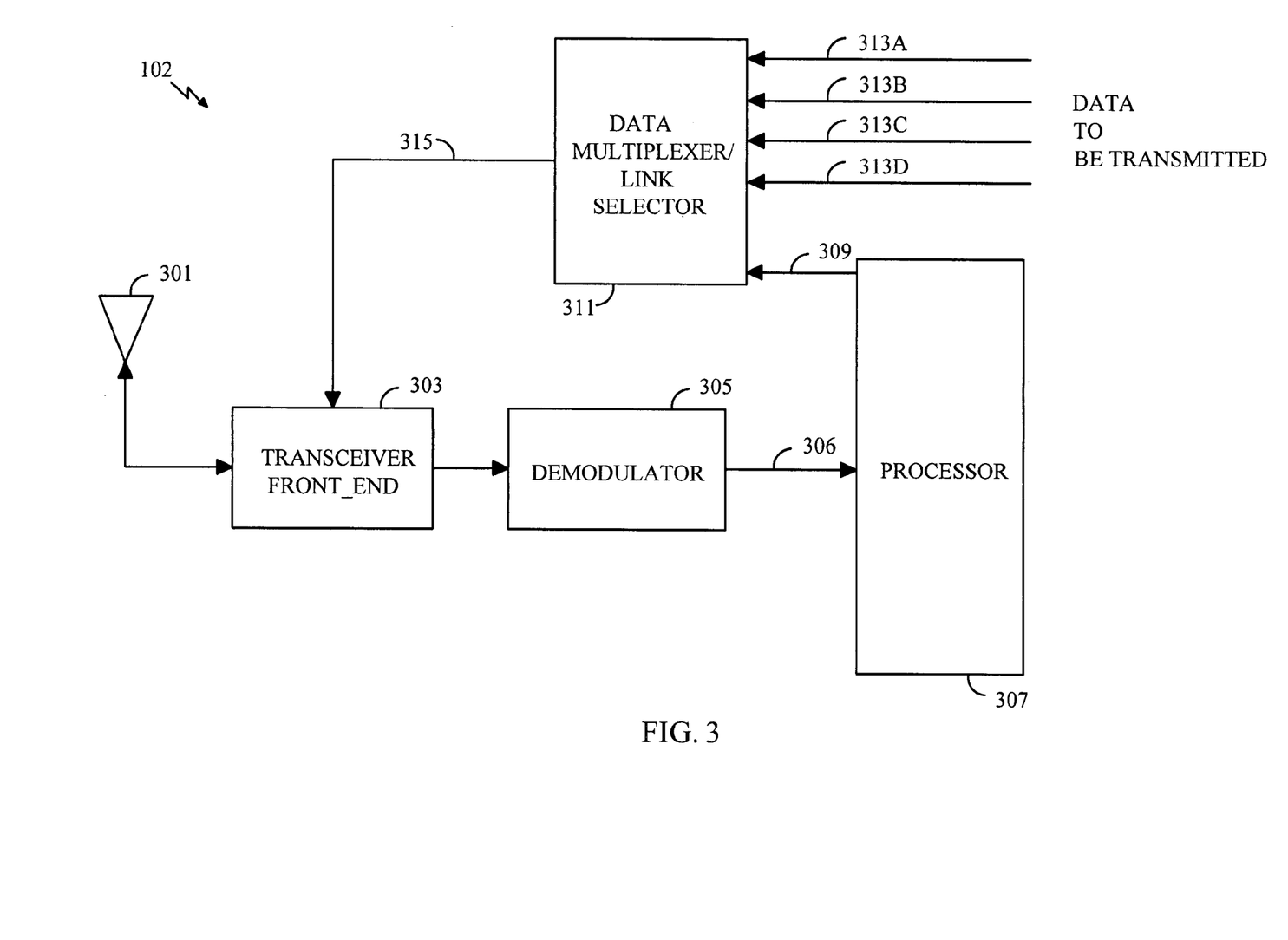
FIG. 3 is a simplified block diagram of a common transmitting station capable of operating in accordance with various aspects of the invention.

FIG. 3 is a simplified block diagram of a common transmitting station 102 capable of operating in accordance with various aspects of the invention. The common transmitting station 102 receives signals that include instantaneous link quality indicators over an antenna 301. The antenna 301 may be an array of antennas depicted as one element. The antenna 301 is coupled to a transceiver front-end 303. The transceiver front-end includes well known conventional radio frequency (RF) components that allow the signal to be received and converted to a base band signal, such as a diplexer, down converters, filters, etc. The base band signal is then coupled to a demodulator 305. The demodulator 305 demodulates the base band signal to allow the instantaneous link quality indicator information to be accessed. The instantaneous link quality indicator information is then coupled to a processor 307. The processor 307 may be any programmable device, state machine, discrete logic, or combination of these (such as might be included within an application specific integrated circuit (ASIC) or programmable gate array) that is capable of performing the functions associated with processor 307.

Figure 4:
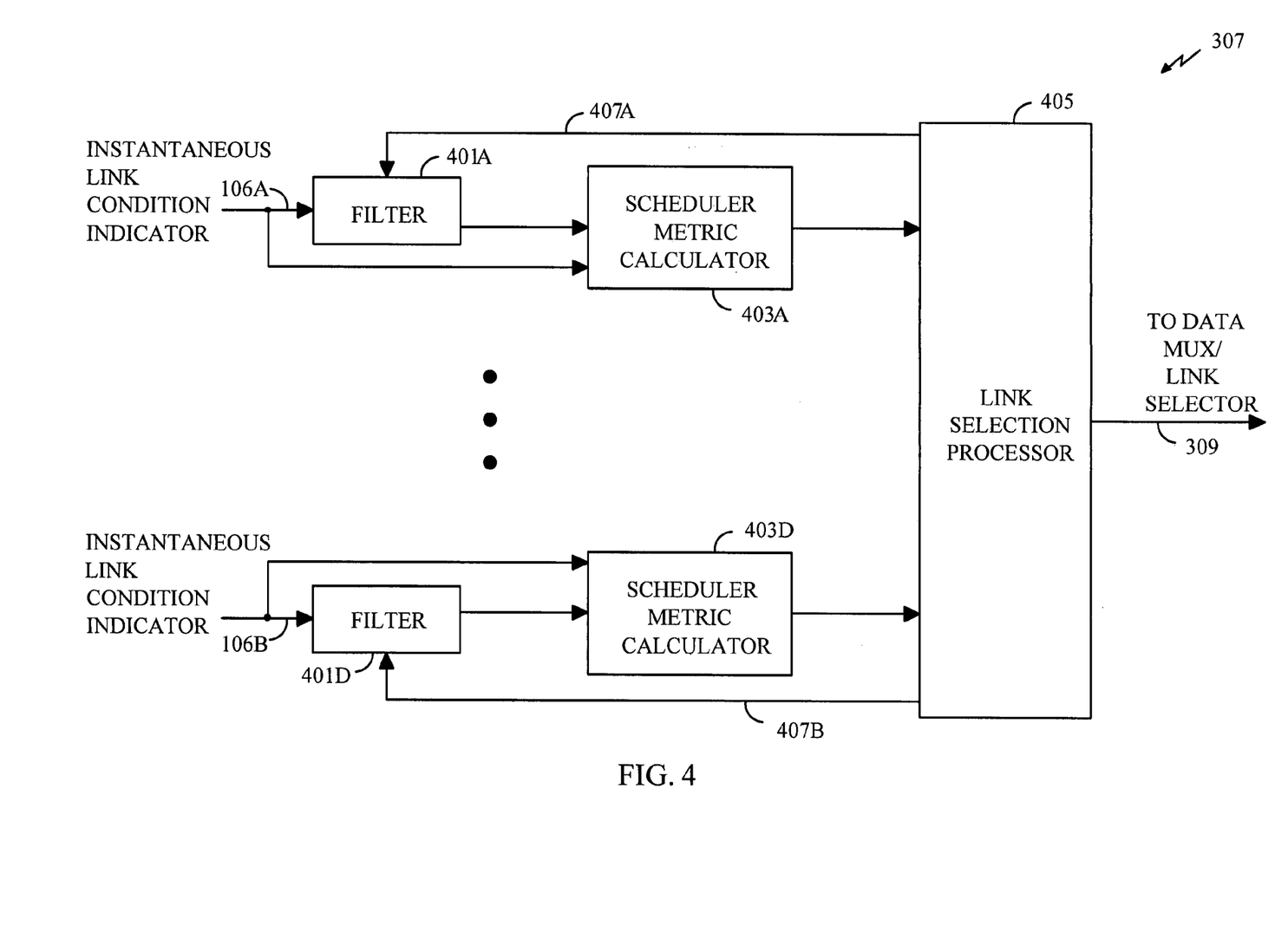
FIG. 4 is a functional block diagram of the functions performed by the processor in accordance with various aspects of the invention.

FIG. 4 is a functional block diagram of the functions performed by the processor 307. As shown in FIG. 4, the processor 307 includes filter modules 401, scheduler metric calculator modules 403, and a link selection processor 405. It will be clear to those skilled in the art that each of the functions performed by processor 307 and depicted in FIG. 4 may be integrated into a single software or hardware module, or alternatively may be integrated into modules in any grouping desired. Accordingly, any group of one or more of the functions performed by the processor 307 may be performed by a single module. Nonetheless, for the sake of clarity, one filter module 401A and one metric calculator module 403A are shown to be associated with the instantaneous link quality indicators received from one user 104A, such that there is a one-to-one correspondence between links of the channel 106 and filter modules 401 and likewise between filter modules 401 and scheduler metric calculator modules 403. The processing of only one link 106A is described in detail to simplify this disclosure.

The processor 307 receives an instantaneous link quality indicator indicative of the instantaneous condition of the link 106A within the filter module 401A associated with that link 106A for each time slot. The filter module 401A calculates a filter output value based upon the instantaneous link quality indicators received for the link 106A. In accordance with various aspects of the invention, the filter performs a low pass filter function.

The low pass function can be performed using one of several filter functions. In accordance with one such filter function, the filter output value F(t) is calculated as provided in the following expression:

$$F_k(t+1) = (1 - 1/t_c) * F_k(t) + 1/t_c * (ChC_k)$$ Eq. 1 where $F_k(t)$ is the current filter output value at time t for the $k^{th}$ link, $t_c$ is a time constant of a low pass filter function provided by this expression, and $ChC_k$ is the instantaneous link quality indicator for the $k^{th}$ link. The time constant represents a "fairness time_scale". The fairness time-scale represents the duration of time over which it is desirable to have essentially equal amounts of data transmitted to each user. It should be understood that the fairness time-scale is dependent upon factors that include the type of data that is being transmitted to the users. For example, assume the transmission of internet data to users attempting to gain access to the internet. If each user receives essentially equal amounts of data over a duration of approximately one second, each user is likely to consider the access granting scheme to be fair, even if one user gets greater access for the entire beginning portion of a second. Accordingly, one second would be an appropriate fairness time-scale.

Alternatively, the low pass filter function used to generate the filter output value sums the instantaneous link quality indicators received for a link and divides the sum by the total number of such instantaneous link quality indicators that were summed. This is shown in the following equation:

$$F(t+1) = \frac{1}{t_c} \sum_{j=(t+1)-t_c}^{t} ChC_k(j) \qquad \text{Eq. 2}$$

However, in accordance with various aspects of the invention, the filter output value is the average data throughput. In this case, the filter output value is calculated as the average of the instantaneous link quality representing the link quality during the time when the link has been selected. Accordingly, the filter output value is calculated differently depending upon whether the link 106A was selected in the last slot or not. The filter module 401A is preferably coupled to the link selection processor 405. The link selection processor 405 indicates whether the link 106A was selected in the last slot. If so, then the filter output value is calculated by the following expression:

$$F_k(t+1) = (1-1/t_c)*F_k(t) + 1/t_c*(ChC_k) \qquad \text{Eq. 3}$$

To have the filter output value represent the average throughput, the link condition ChC must be proportional to the data rate. It can be seen from Eq. 3 that if the link 106A was selected, the filter output value will be modified to become closer in value to the value representing the instantaneous link quality at the time the value of the most recent instantaneous link quality indicator was determined. Alternatively, if the link 106A was not selected in the last slot, the filter output value is calculated by the following expression:

$$F_k(t+1) = (1-1/t_c)*F_k(t) \qquad \text{Eq. 4}$$

If the instantaneous link quality is proportional to the data rate to be used for the transmission to the user 104 over the selected link of the channel 106, then the resulting filter output value will be the average data throughput filtered by a low pass filter having a time constant $t_c$.

It can be seen from Eq. 4 that whenever the link 106A is not selected the filter output value decays at a rate determined by the time constant $t_c$. The updated value does not take into account the instantaneous condition of the link. The filter output value for the link 106A will continue to decay, regardless of the condition of the link, until the link 106A is selected again. At that time, the filter output value will be updated using the instantaneous link quality indicator (i.e., the instantaneous link quality indicator value most recently received from the user, by the common transmitting station 102). In the case in which the instantaneous link quality indicators are related to the rate at which data is to be transmitted over the link 106A, the filter output value is a representation of the total throughput of the link 106A. That is, Eq. 4 can be thought of as a low pass filter function with a time constant of $t_c$ applied to the instantaneous rate at which data is being transmitted through the link. The result of the filtering is an average rate at which data is being transmitted through the link for a period of time equal to the time constant $t_c$.

In an alternative filter designed to determine the average data throughput, for each slot in which the link associated with the filter is selected, the low pass filter function sums the instantaneous link quality indicators received for a link and divides the sum by the total number of such instantaneous link quality indicators that were summed. When the link associated with the filter is not selected, the filter output value decays in accordance with Eq. 4.

It should be noted that in one embodiment of the presently disclosed method and apparatus, the initial value for the filter output value is equal to $R_{min}/N$, where $R_{min}$ is the minimum value allowed for the instantaneous link quality indicator, and N is the total number of users 104. However, any reasonable initial value may be predetermined for the filter output value.

In accordance with another embodiment of the presently disclosed method and apparatus, the filter output value is biased upward by a constant each time the link associated with that filter output value is selected. One such method of biasing the filter output value is to add a positive constant value to the filter output value, or to multiply the filter output value by a constant greater than one, in addition to time constant $t_c$ or any other adjustment to the value, whenever the link associated with that filter output value is selected. Such a direct bias to the filter output value will increase the filter output value, and thus make it less likely that the link associated with that filter output value will be selected in the next slot.

Once calculated, the filter output value is coupled to the scheduler metric calculator 403A together with the most recently received instantaneous link quality indicator. The most recently received instantaneous link quality indicator represents the instantaneous link quality in the form of the C/I ratio of the link, the instantaneous data rate, or any other such parameter that indicates the current quality of the link.

The scheduler metric is calculated as a function of the instantaneous link condition and the average link condition. In accordance with various aspects of the invention, the scheduler metric is calculated as a function of: (1) the C/I ratio of the link and the filter output value; or (2) the instantaneous data rate and the filter output value. In accordance with various aspects of the invention, the scheduler metric can be calculated as a function of any other measure of the instantaneous link condition relative to the filter output value.

The filter output value is a function of either: (1) the average data rate, or (2) the average link condition. Therefore, the scheduler metric is, for example, a function of: (1) the average data rate and the instantaneous link condition, (2) the average link quality and the instantaneous link quality, (3) the average data rate and the instantaneous data rate, or (4) the average link quality and the instantaneous data rate. In accordance with one embodiment, the scheduler metric calculator 403A divides the most recently received instantaneous link quality indicator by the filter output value to calculate an scheduler metric, AM.

$$AM = ChC_k/F_k(t) \qquad \text{Eq. 5}$$

It can be seen that the value of the scheduler metric is directly proportional to the instantaneous link quality. The higher the instantaneous link quality, the greater the scheduler metric for that particular link. The scheduler metric is calculated for each link based upon the filter output value calculated for each link. The scheduler metrics of all of the links contained in the channel 106 are then directly compared by the link selection processor 405 to determine which link of the channel 106 is to be selected for transmission in the next slot. The channel associated with the greatest scheduler metric value is selected.

The link selection processor 405 is coupled to each scheduler metric calculators 403 via signal lines 407. Signal lines 407 couple information from the link selection processor 405 to each filter module 401. The information indicates which link of the channel 106 was selected for transmission in the next slot. The information may be in the form of a value indicating the particular link of the channel 106 that was selected. Alternatively, the information may be a digital value indicating whether or not the receiving filter module 401 is associated with the selected link. It should be understood that in the case in which the functions of the filter module 401, the scheduler metric calculator, and the link selection processor are all performed in one module, there may be no need for "signals" to be generated to indicate the results of each function. Alternatively, the results of one or more of the functions may be stored in a location accessible to one or more of the other functions.

Referring back to FIG. 3, the processor 307 outputs information indicating which link of the channel 106 has been selected on a signal line 309 to a data-multiplexer/link-selector 311. Several data lines 313A, 313B, 313C, 313D provide data to the data-multiplexer/link-selector 311. Each of the data lines provides data that is to be transmitted to one of the users 104. In response to the signal provided on the signal line 309, the data-multiplexer/link-selector 311 selects one of several data streams to be coupled to the transceiver front end 303. The selected data stream is coupled to the transceiver front end over a signal line 315. In accordance with the preferred embodiment of the presently disclosed method and apparatus, the transceiver front end 303 transmits the information received on signal line 315 to the user 104 associated with the selected link of the channel 106 at a rate that is proportional to the most recent instantaneous link quality indicator received from selected user 104.

In accordance with various aspects of the invention, the common transmitting station 102 transmits signals to more than one user in each time slot. The common transmitting station 102 uses available power to first transmit signals to all of the constant bit rate (CBR) users and all the variable bit rate (VBR) users for which the common transmitting station 102 has data. Alternatively, if additional power is available after transmission to CBR users, then the common transmitter transmits to all of the variable bit rate (VBR) users for which the transmitting station 102 has data. If, after transmitting to all CBR and VBR users, there remains available power for additional signals to be transmitted, the common transmitting station 102 transmits to available bit rate (ABR) users. If the total power required by all of the ABR users exceeds the available power, then the following scheme is used to determine to which ABR users the common transmitter will transmit. It should be understood that techniques can be used that allow a receiver to receive signals with less power than is necessary to decode the information transmitted in the signals without retransmission. In accordance with these techniques, power is accumulated over several repetitive transmissions (e.g., using R-rake receivers). Accordingly, the amount of power that is "required" will depend upon the number of times the common transmitting station will retransmit information.

In accordance with one embodiment of the presently disclosed method and apparatus, the common transmitter 102 determines an scheduler metric based on the condition of the link to each user and the "throughput". Throughput is defined as the amount of information that has been transmitted over a period of time. Accordingly, throughput can be associated with one or more users. The throughput associated with a particular user is the amount of information that has been transmitted to that user. The throughput of the system is the total amount of information that has been transmitted to all users.

Throughput is preferably determined for each user by applying a filter function as follows:

$$T_k(t+1)=(1-(1/t_f))T_k(t)+(1/t_f)R_k(t) \qquad \text{Eq. 6}$$

where $T_k(t)$ is the throughput at time t for the $k^{th}$ user, $t_f$ is a filter time constant, and $R_k(t)$ is the rate at which data was last transmitted to the $k^{th}$ user.

In accordance with one embodiment of the disclosed method and apparatus, if the common transmitter 102 has not transmitted to the $k^{th}$ user in the last time slot, then $R_k(t)$ is equal to zero. Accordingly, if the common transmitter has not transmitted to the $k^{th}$ user, then Eq. 6 reduces to the following equation for the $k^{th}$ user:

$$T_k(t+1)=(1-(1/t_f))T_k(t) \qquad \text{Eq. 7}$$

where Tk (t) is the throughput at time t for the $k_{th}$ user and $t_f$ is a filter time constant.

Accordingly, a filter applies either Eq. 6 or Eq. 7 and outputs a filter output value associated with each user, each such value representing the throughput of a user. An instantaneous link quality is determined for each link between the common transmitting station 102 and each user. In one embodiment of the presently disclosed method and apparatus, the instantaneous quality of the link to the $k^{th}$ user is the carrier-to-interference (C/I) ratio for the link to the $k^{th}$ user. It will be understood by those skilled in the art that any one of several well known methods can be used to determine the value of C/I.

In one embodiment of the presently disclosed method and apparatus, the scheduler metric is a function of C/I and throughput. In one such embodiment, the instantaneous quality of the link to the $k^{th}$ user is divided by the throughput (i.e., the filter output value for the $k^{th}$ user) of the link to the $k^{th}$ user to generate an scheduler metric. In another embodiment of the presently disclosed method and apparatus, the scheduler metric is a function of the ratio of the instantaneous link quality to the link quality averaged over time.

In the case in which the scheduler metric is a function of the ratio of the C/I to the throughput, the scheduler metric is used to determine to which ABR user, or users, information is to be transmitted in order to optimize the total system throughput while maintaining some level of "fairness" (i.e., essentially equitable system access) to all of the ABR users.

In one embodiment of the presently disclosed method and apparatus, a user may indicate to the common transmitting station 102 that a frame of data was not received or was received with more than a threshold number of errors. In this case, the throughput value associated with that user is preferably corrected to account for the fact that the data that was sent was not properly received. In accordance with one embodiment of the presently disclosed method and apparatus, the correction is made as follows:

$$T_k(\text{new})=T_k(\text{old})-(1/t_f)R_k(t) \qquad \text{Eq. 8}$$

where $T_k(\text{new})$ is the corrected throughput value, $T_k(\text{old})$ is the throughput value prior to correction, $R_k(t)$ is the rate at which data was transmitted to the $k^{th}$ user during the last time slot t, and $t_f$ is the filter time constant that was used to update the throughput value $T_k(\text{old})$ to account of the rate at which information was transmitted at time t.

Accordingly, the resulting throughput $T_k(\text{new})$ will have the value that would have been calculated if no transmission were attempted during time t. This is appropriate, since the user did not receive the data that was transmitted during time t. In an alternative method and apparatus, the value of $T_k(t+1)$ can be returned to the value $T_k(t)$.

It should be noted that each user could receive data from the common transmitting station 102 at any data rate that is appropriate. Therefore, the common transmitting station 102 must determine the rate at which data is to be transmitted to each selected ABR user. In accordance with one embodiment of the disclosed method and apparatus, the amount of power that is available is used to determine the rate at which data will be transmitted to each selected ABR user. The ABR user with the greatest scheduler metric is selected first. Transmissions are preferably made to that user at the highest rate possible. If there is any additional power available, then the ABR user with the next highest scheduler metric is selected. The common transmitter preferably transmits to this user with the highest rate possible. This process continues until as much of the available power has been allocated as is possible. Alternatively, the available power can be allocated to each user based upon the relative value of the scheduler metric associated with each ABR user. In yet another alternative, both the data rate and the amount of power to be used in transmitting to each user can be determined based on both the number of ABR users to which the common transmitting station 102 desires to transmit and the amount of available power.

For example, for N selected users wherein the $i^{th}$ user has a scheduler metrics $A_i$, each user can be given the following fraction of total available power:

A common transmitting station 102 can transmit to the five ABR users having the five $$\frac{A_i}{\sum_{k=1}^{N} A_k} \quad \text{Eq. 9}$$

greatest scheduler metric values with power being divided among the users in proportion to the scheduler metric associated with each user. It should be understood by those skilled in the art that there is a large variety of ways by which selection of the number of ABR users and the rates at which information is to be transmitted to them can be made. A significant feature of the disclosed method and apparatus is that a scheduler metric is used to assist in selecting to which, from among a plurality of ABR users, transmissions are to be made.

In some cases, a common transmitter 102 may not have data ready for transmission to the ABR user with the best scheduler metric. In this case, the throughput value associated with that user can be adjusted in one of at least three ways. First, the throughput value can be adjusted as though data were to be sent to that user at the rate that would have been selected if information were available for transmission. Second, the throughput value can be left unadjusted for that time slot. Third, the throughput value can be adjusted in the same manner as if the user were not selected for transmission.

Various embodiments of the invention includes apparatus and method of communication between a plurality of users and a remote transmitting station 102 over a plurality of channels 106 in a communication system 100. The processor 307 associates each one of the plurality of users 104 with at least one of the plurality of channels 106. A user may be associated more than one channel. Similarly, a channel may be associated with a plurality of users. A user may receive data from the transmitter over any channel associated with that user. In other words, whenever a user is associated with a channel, the channel contains a link from the transmitter to that user. Therefore, a user may have one link with the transmitter on each of the channels associated with that user. For example, link 106A shown in FIG. 1 may represent, in accordance with an embodiment, a number of links over a number of channels. Each one of the plurality of channels may be characterized by at least one of transmission frequency, transmission time and transmit antenna used for providing the communication. For example, transmitting station 102 may include a number of transmit antennas for transmission to the users 104. The transmit antenna 103 may include a number of radiating elements, not shown, where each element may be considered an antenna. The elements may have different characteristics, such as radiation pattern and direction. The transmission frequencies, transmission time and transmission antennas may be selected by processor 307 for transmission of data 313 to each user on each assigned channel.

The processor 307, furthermore, assigns a scheduling metric to each of the plurality of links in the plurality of channels. Equivalently, a user is assigned a scheduling metric on each link in the channels associated with the user. The scheduling metric may be based on a number of factors, such as link quality, transmission throughput of the link, or the throughput of the user associated with that link. The link quality may be based on the (C/I) of the link, the maximum possible communication data rate on that link, etc. Assigning the scheduling metric to the plurality of channels may be based on at least a link quality report received from at least one the plurality of users 104. The link quality report may include a report of at least a set of channels assigned to one of the plurality of users 104. The scheduling metric may be based on instantaneous factors or filtered factors as described throughout.

The scheduling metric may be determined by determining for each link, a value representing the amount of data transmitted on each link, or to the user at over all that links associated with that user, over a predetermined amount of time, a value representing the highest data rate at which each link can currently receive data, and, for each channel, a ratio of the received value representing the highest data rate, with respect to the value representing the amount of data transmitted. On each channel, the transmitter may select a determined number of links, whose the scheduler metric is not worse than the scheduler metric of all other links in that channel. The channel is then used to transmit data on respective links to the users of the selected links.

The processor 307 determines a number of links, from among the plurality of links contained in a plurality of channels, for the communication based on the scheduling metric computed for each link. The links with a metric representing a good link quality may be selected as the determined number of links for the communication to the users 104. In one embodiment, the metric associated with some of the links may indicate poor link quality, and the processor 307 does not include such links for the determined number of links for the communication to the users 104. In another embodiment, all the links may exhibit satisfactory link quality to be included in the determined number of channels for the communication to the users 104.

In one embodiment, transmitting station 102 may transmit to at least one of the plurality of users 104 over more than one of the determined number of channels (through the unique link to the user on each of the channels) over essentially a common transmission time frame. In such an embodiment, the user may receive communication over essentially the same time over several channels. The channels may be over different frequencies, or from different transmit antennas, or a combination of both. As such, more than one of the determined number of channels are over at least two different transmission frequencies, or from at least two different transmission antennas or a combination of both.

A number of embodiments have been described. Nevertheless, it will be understood that various modifications may be made without departing from the spirit and scope of the invention. Accordingly, it is to be understood that the invention is not to be limited by the specific illustrated embodiment, but only by the scope of the appended claims.

We claim:

1. A method of communication between a plurality of users and a remote transmitting station over a plurality of communication links in a communication system, comprising:
   assigning each one of the plurality of users to at least one of the plurality of communication links;
   assigning a scheduling metric to each one of said plurality of communication links, said scheduling metric being based in part on a ratio of a link quality and a user data throughput; and
   selecting a number of said plurality of communication links for transmission of data for said communication based on said assigned scheduling metric.

2. The method as recited in claim 1 further comprising:
   transmitting from said remote transmitting station to at least one of said plurality of users over one or more of said selected number of communication links over essentially a common transmission time frame.

3. The method as recited in claim 2 wherein said plurality of communication links are over at least two different channel transmission frequencies.

4. The method as recited in claim 2 wherein said plurality of communication links are over at least two different transmission antennas.

5. The method as recited in claim 1 further comprising:
   determining said scheduling metric based on a ratio of an instantaneous link quality and an average user data throughput.

6. The method as recited in claim 5 wherein said instantaneous link quality includes a factor of a determined possible maximum communication data rate.

7. The method as recited in claim 5 wherein said instantaneous link quality includes a factor of a communication link carrier to noise-and-interference ratio.

8. The method as recited in claim 1 wherein said scheduling metric assigned to said plurality of communication links is based on at least a communication link quality report received from at least one of said plurality of users.

9. The method as recited in claim 8 wherein said communication link quality report includes report of at least one communication link of said plurality of communication links provided by a communication channel characterized by at least one of transmission frequency, transmission time and transmit antenna.

10. The method as recited in claim 1 further comprising:
    assigning said plurality of communication links, for said communication, to at least one of communication channels characterized by at least one of transmission frequency, transmission time and transmit antenna.

11. The method as recited in claim 1 further comprising:
    determining said scheduling metric by determining, for each communication link, at least a quality factor selected from a number of quality factors including:
    a value representing data throughput,
    a value representing user data throughput as determined by an amount of data transmitted to a user over a period of time over one or more of the communication links assigned the user,
    a value representing a highest possible communication data rate over at least one of said communication links assigned to the user, and
    a value representing a ratio of instantaneous or filtered values of at least two of said number of quality factors.

12. The method as recited in claim 1 wherein said selecting said number of said plurality of communication links for said communication based on said assigned scheduling metric includes selecting the communication links associated with high value scheduling metric.

13. The method as recited in claim 1 further comprising:
    transmitting over said selected number of said plurality of communication links for said communication.

14. An apparatus for communication between a plurality of users and a remote transmitting station over a plurality of communication links in a communication system, comprising:
    means for assigning each one of the plurality of users to at least one of the plurality of communication links;
    means for assigning a scheduling metric to each one of said plurality of communication links, said scheduling metric being based in part on a ratio of a link quality and a user data throughput;
    means for selecting a number of said plurality of communication links for transmission of data for said communication based on said assigned scheduling metric.

15. The apparatus as recited in claim 14 further comprising:
    a transmitter for transmitting from said remote transmitting station to at least one of said plurality of users over one or more of said selected number of communication links over essentially a common transmission time frame.

16. The apparatus as recited in claim 15 wherein said plurality of communication links are over at least two different channel transmission frequencies.

17. The apparatus as recited in claim 15 wherein said plurality of communication links are over at least two different transmission antennas.

18. The apparatus as recited in claim 14 further comprising:
    means for determining said scheduling metric based on a ratio of an instantaneous link quality and an average user data throughput.

19. The apparatus as recited in claim 18 wherein said instantaneous link quality includes a factor of a determined possible maximum communication data rate.

20. The apparatus as recited in claim 18 wherein said instantaneous link quality includes a factor of a communication link carrier to noise-and-interference ratio.

21. The apparatus as recited in claim 14 wherein said scheduling metric assigned to said plurality of communication links is based on at least a communication link quality report received from at least one of said plurality of users.

22. The apparatus as recited in claim 21 wherein said communication link quality report includes report of at least one communication link of said plurality of communication links provided by a communication channel characterized by at least one of transmission frequency, transmission time and transmit antenna.

23. The apparatus as recited in claim 14 further comprising:
   means for assigning said plurality of communication links, for said communication, to at least one of communication channels characterized by at least one of transmission frequency, transmission time and transmit antenna.

24. The apparatus as recited in claim 14 further comprising:
   means for determining said scheduling metric by determining, for each communication link, at least a quality factor selected from a number of quality factors including:
   a value representing data throughput,
   a value representing user data throughput as determined by an amount of data transmitted to a user over a period of time over one or more of the communication links assigned the user,
   a value representing a highest possible communication data rate over at least one of said communication links assigned to the user, and
   a value representing a ratio of instantaneous or filtered values of at least two of said number of quality factors.

25. The apparatus as recited in claim 14 wherein said selecting said number of said plurality of communication links for said communication based on said assigned scheduling metric includes selecting the communication links associated with high value scheduling metric.

26. The apparatus as recited in claim 14 further comprising:
   a transmitter for transmitting over said selected number of said plurality of communication links for said communication.

* * * * *